US010628802B2

(12) United States Patent
Durand et al.

(10) Patent No.: US 10,628,802 B2
(45) Date of Patent: Apr. 21, 2020

(54) SYSTEMS AND METHODS FOR ASSESSING DAMAGE TO INFRASTRUCTURE ASSETS (71) Applicant: LOCKHEED MARTIN CORPORATION, Bethesda, MD (US)

(72) Inventors: Reed Durand, Owego, NY (US); Timothy Douglas, Lisle, NY (US); Joseph T. Morrison, Apalachin, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 190 days.

(21) Appl. No.: 15/159,362

(22) Filed: May 19, 2016

(65) Prior Publication Data

US 2017/0337524 A1 Nov. 23, 2017

(51) Int. Cl.
G06Q 10/00 (2012.01)
G06K 9/62 (2006.01)
G06K 9/00 (2006.01)

(52) U.S. Cl.
CPC ......... *G06Q 10/20* (2013.01); *G06K 9/00637* (2013.01); *G06K 9/627* (2013.01); *G06K 9/6277* (2013.01)

(58) Field of Classification Search
None
See application file for complete search history.

(56) References Cited

U.S. PATENT DOCUMENTS

| 5,633,946 A | 5/1997 | Lachinski et al. |
| 7,233,691 B2 | 6/2007 | Setterholm |
| 8,275,547 B2 | 9/2012 | Rousselle et al. |
| 8,275,570 B2 | 9/2012 | Rousselle |
| 8,352,410 B2 | 1/2013 | Rousselle et al. |
| 8,374,821 B2 | 2/2013 | Rousselle et al. |
| 8,510,196 B1 | 8/2013 | Brandmaier et al. |
| 8,680,994 B2 | 3/2014 | Leppanen et al. |
| 9,129,355 B1 | 9/2015 | Harvey et al. |
| 2003/0081827 A1* | 5/2003 | Paz-Pujalt ............ G06K 9/0063 382/152 |
| 2009/0265193 A1 | 10/2009 | Collins et al. |
| 2011/0006297 A1 | 1/2011 | Inoue et al. |

(Continued)

FOREIGN PATENT DOCUMENTS

CN 102353355 A * 2/2012

OTHER PUBLICATIONS

International Search Report and Written Opinion of the International Searching Authoritydated Apr. 14, 2017 in PCT Application No. PCT/US17/17462, 9 pages.

(Continued)

*Primary Examiner* — Lina M Cordero
(74) *Attorney, Agent, or Firm* — Kent Kemeny; Andrew M. Calderon; Roberts Calderon Safran & Cole, P.C.

(57) ABSTRACT

A computer-implemented method comprises: receiving, by a computing device, sensor data associated with a geographic location; processing, by the computing device, the sensor data to identify an infrastructure asset within the geographic location; performing, by the computing device, a preliminary damage assessment of the infrastructure asset based on processing the sensor data; and storing or outputting, by the computing device, information regarding the preliminary damage assessment.

22 Claims, 9 Drawing Sheets

(56) References Cited

U.S. PATENT DOCUMENTS

| | | |
|---|---|---|
| 2011/0066297 A1 | 3/2011 | Saberi et al. |
| 2012/0101783 A1 | 4/2012 | Stephens et al. |
| 2012/0154446 A1 | 6/2012 | Adams et al. |
| 2013/0113831 A1 | 5/2013 | Giuffrida et al. |
| 2013/0135471 A1 | 5/2013 | Giuffrida et al. |
| 2013/0138401 A1 | 5/2013 | Thornberry et al. |
| 2013/0147802 A1 | 6/2013 | Thornberry et al. |
| 2013/0155109 A1 | 6/2013 | Schultz et al. |
| 2013/0170694 A1 | 7/2013 | Thornberry et al. |
| 2013/0205900 A1 | 8/2013 | Nulty |
| 2013/0208116 A1 | 8/2013 | Schultz et al. |
| 2013/0208996 A1 | 8/2013 | Schultz et al. |
| 2013/0212536 A1 | 8/2013 | Thornberry et al. |
| 2013/0216089 A1 | 8/2013 | Chen et al. |
| 2013/0315503 A1 | 11/2013 | Giuffrida et al. |
| 2014/0003707 A1 | 1/2014 | Thornberry et al. |
| 2014/0009626 A1 | 1/2014 | Schultz et al. |
| 2014/0029867 A1 | 1/2014 | Giuffrida et al. |
| 2014/0063243 A1 | 3/2014 | Giuffrida et al. |
| 2014/0111554 A1 | 4/2014 | Schultz et al. |
| 2014/0125664 A1 | 5/2014 | Freund et al. |
| 2014/0126816 A1 | 5/2014 | Schultz et al. |
| 2014/0126838 A1 | 5/2014 | Schultz et al. |
| 2014/0188574 A1 | 7/2014 | Luca |
| 2014/0198211 A1 | 7/2014 | Giuffrida et al. |
| 2014/0236650 A1 | 8/2014 | Davenport et al. |
| 2014/0278697 A1 | 9/2014 | Thornberry et al. |
| 2014/0278708 A1 | 9/2014 | Byk et al. |
| 2014/0358601 A1* | 12/2014 | Smiley ............... G06Q 10/0635 705/7.11 |
| 2015/0078668 A1 | 3/2015 | Adams et al. |
| 2015/0092184 A1 | 4/2015 | Schultz |
| 2015/0170413 A1 | 6/2015 | Freund et al. |
| 2015/0178416 A1 | 6/2015 | Stephens et al. |
| 2015/0193988 A1 | 7/2015 | Jenkins et al. |
| 2015/0221079 A1 | 8/2015 | Schultz et al. |
| 2015/0227644 A1 | 8/2015 | Schultz |
| 2015/0254901 A1 | 9/2015 | Pollock et al. |
| 2015/0269720 A1 | 9/2015 | Mondello |
| 2015/0302253 A1 | 10/2015 | Stewart |

OTHER PUBLICATIONS

Zhengrong et al., "Advances in vegetation management for power line corridor monitoring using aerial remote sensing techniques", http://ieeexplore.ieee.org/document/5624431/, IEEE Applied Robotics for the Power Industry (CARPI), Oct. 2010, 4 pages.

International Search Report and Written Opinion of the International Searching Authority dated Apr. 25, 2017 in related PCT Application No. PCT/US17/17426, 12 pages.

Matzner et al., "Automated Damage Assessment for Event Response from Overhead Imagery",https://ams.confex.com/ams/96Annual/webprogram/Handout/Paper284157/AMSAutomated_Damage_Assessment.pdf, Homeland Security Science and Technology, Accessed Jun. 10, 2016, 16 pages.

Office Action dated Jan. 4, 2018 in related U.S. Appl. No. 15/177,875, 8 pages.

Notice of Allowance dated Apr. 20, 2018 in related U.S. Appl. No. 15/177,875, 7 pages.

* cited by examiner

SYSTEMS AND METHODS FOR ASSESSING DAMAGE TO INFRASTRUCTURE ASSETS

FIELD OF INVENTION

The present invention relates to infrastructure damage assessment, and more particularly, to utilizing sensor and imagery data to automatically assess infrastructure damage.

BACKGROUND

Infrastructure assets, such as utility poles, electrical wires, gas lines, water lines, etc., may become damaged as a result of natural disasters (e.g., severe thunderstorms, hail, wind, hurricanes, floods, tornadoes, blizzards, etc.), manmade disasters, wear-and-tear, etc. Damage to infrastructure assets causes service interruptions, which can be inconvenient, create supply and manpower shortages.

Repairing damaged infrastructure involves assessing infrastructure damage in order to determine which assets are damaged, the extent of the damage, and dispatching the proper repair personnel and equipment to repair damaged infrastructure based on the extent of the damage. Assessing damaged infrastructure is typically a time-consuming process which, in turn, delays the repair of infrastructure and the restoration of service. For example, assessing damaged infrastructure typically involves in-person observation, sometimes at road or utility line elevation, causing slow assessments, and limited accessibility. Also, assessing damaged infrastructure involves determining the extent of the damage.

SUMMARY

In an aspect of the invention, a computer-implemented method comprises: receiving, by a computing device, sensor data associated with a geographic location; processing, by the computing device, the sensor data to identify an infrastructure asset within the geographic location; performing, by the computing device, a preliminary damage assessment of the infrastructure asset based on processing the sensor data; and storing or outputting, by the computing device, information regarding the preliminary damage assessment.

In an aspect of the invention, there is a computer program product for automatically assessing damage to infrastructure. The computer program product includes a computer readable storage medium having program instructions embodied therewith. The program instructions are executable by the computing device to cause the computing device to receive sensor data associated with a geographic location; process the sensor data to identify an infrastructure asset within the geographic location; perform a preliminary damage assessment of the infrastructure asset based on processing the sensor data; perform a detailed damage assessment on a component of the infrastructure asset when the preliminary damage assessment produces an inconclusive result or a result less than a threshold confidence; and store or output information regarding the preliminary damage assessment and the detailed damage assessment.

In an aspect of the invention, a system includes: a CPU, a computer readable memory and a computer readable storage medium associated with a computing device; program instructions to program instructions to receive sensor data associated with a geographic location; program instructions to process the sensor data to identify an infrastructure asset within the geographic location; program instructions to perform a preliminary damage assessment of the infrastructure asset based on processing the sensor data; program instructions to perform a detailed damage assessment on a component of the infrastructure asset; program instructions to compare results of the preliminary damage assessment with results of the detailed damage assessment; and program instructions to refine a process used to perform the detailed damage assessment based on comparing the results of the preliminary damage assessment with the results of the detailed damage assessment, wherein the program instructions are stored on the computer readable storage medium for execution by the CPU via the computer readable memory. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates to infrastructure damage assessment, and more particularly, to utilizing sensor and imagery data to automatically assess infrastructure damage. Aspects of the present invention include systems and/or methods to automate the assessment of damage to infrastructure assets (e.g., utility poles, electrical distribution power lines, communication lines, guy wires, gas lines, water lines, etc.) based on imagery and sensor data. For example, the systems and/or methods gather imagery and/or sensor data via aerial and/or ground vehicles that survey a defined geographic region (e.g., a geographic region affected by a natural disaster or other event in which infrastructure assets may have become damaged). From the sensor data, computer-implemented processing techniques are used to identify three-dimensional (3D) objects in the geographic region, locate assets in the geographic region from the 3D imagery, assess damage to the assets, and provide information regarding the assessed damage (e.g., the location of damaged assets, portions of assets damaged, etc.).

In embodiments, the systems and methods described herein identify assets from the 3D shapes, perform a preliminary damage assessment of the assets, and perform a more detailed assessment (e.g., a "truth assessment") of certain assets in which the condition of the assets may be unknown, uncertain, or identified as potentially damaged based on the preliminary assessment. In this way, the condition of most assets can be quickly determined, and efforts are directed to determining the condition of assets whose condition may not be initially determined from the preliminary assessment.

Further, automated techniques to perform the preliminary assessment may be iteratively updated based on truth data (e.g., data indicating the actual condition of damage) as part of a software development update. As an example for making a preliminary determination for a utility pole asset, the angle of the pole from the ground to the top of the pole may be determined. The automated techniques to perform the preliminary assessment may be updated based on truth data indicating whether the preliminary determination was correct. For example, as described herein, confidence scores may be generated identifying level of accuracy or confidence in which the preliminary determination was correct. Also, the truth data may be used to determine other features indicating asset damage, and future automated assessment determinations may be made based on these features. The truth data and preliminary assessment may be used to develop a report identifying final determinations of damaged assets. In embodiments, the truth data may be based on the results of more detailed assessments.

As described herein, detailed assessments may identify the condition of separate components of an asset (e.g., the condition of a utility pole, power line support of the pole, power lines connected to the pole, etc.). For example, separate and independent detailed assessments may be performed on the pole, power line support (e.g., cross arms, alley arms standoffs, etc.), and power line in which the details of asset components are thoroughly analyzed to determine the extent of damage to the asset. In embodiments, arbitration techniques may be used to determine overall assessment to refine and build upon independent detailed assessments.

Damage assessment response and repair personnel may use results from preliminary assessments and detailed assessments to aid in the repair of damaged assets in order to restore service. Further, labor and other resources can be focused sooner on repairing damaged assets rather than assessing damage. The damage assessments may also be used to dispatch the best suited repair personnel and equipment that should be deployed to particular damaged assets, thereby expediting repair time, limiting risks to stakeholders, improving estimated time of restoration (ETR), and more efficiently directing material, equipment, and repair crews. Further, the damage assessments may be used to more quickly identify the number of repair crews required so that mutual aid and/or other resources can be requested from other parties. For example, the sooner the request for additional manpower and resources, the more likely and quicker the request will be filled, and the less costly it may be to fill the request. For example, delayed requests for additional manpower and resources would result in crews traveling from a further distance, thus increasing travel time and costs.

In embodiments, the damage assessments may be reviewed and validated by infrastructure administrators. In embodiments, the systems and/or methods described herein may be used to assess the damage of power distribution assets such as utility poles and wires. However, the systems and/or methods are not so limited in that damage may be assessed for other types of assets, even separate components of assets may be assessed for damage. By assessing separate components, this level of detail can be used to better identify the best-suited repair personnel to dispatch to a particular asset based on the components of the asset that are damaged.

Advantageously, aspects of the present invention provide early definition of repair resources and significantly reduce the time to assess infrastructure damage and thus, reduce the amount of time to restore service. Further, aspects of the present invention provide a more thorough damage assessment than in-person ground inspections, as aerial inspections can obtain imagery and sensor data in areas otherwise inaccessible by ground inspections. Further, safety hazards associated with ground inspections are avoided. Aspects of the present invention may also permit automated analysis processing to occur in parallel with the addition of the appropriate computing and processing equipment. In embodiments, preliminary and detailed damage assessments may be automatically performed with a single set of sensor data and imagery (e.g., without requiring a separate flight or collection of "baseline" data). For example, it is possible to perform preliminary and detailed damage assessments utilizing a priori knowledge of asset locations and configurations from an asset database.

Figure 1:
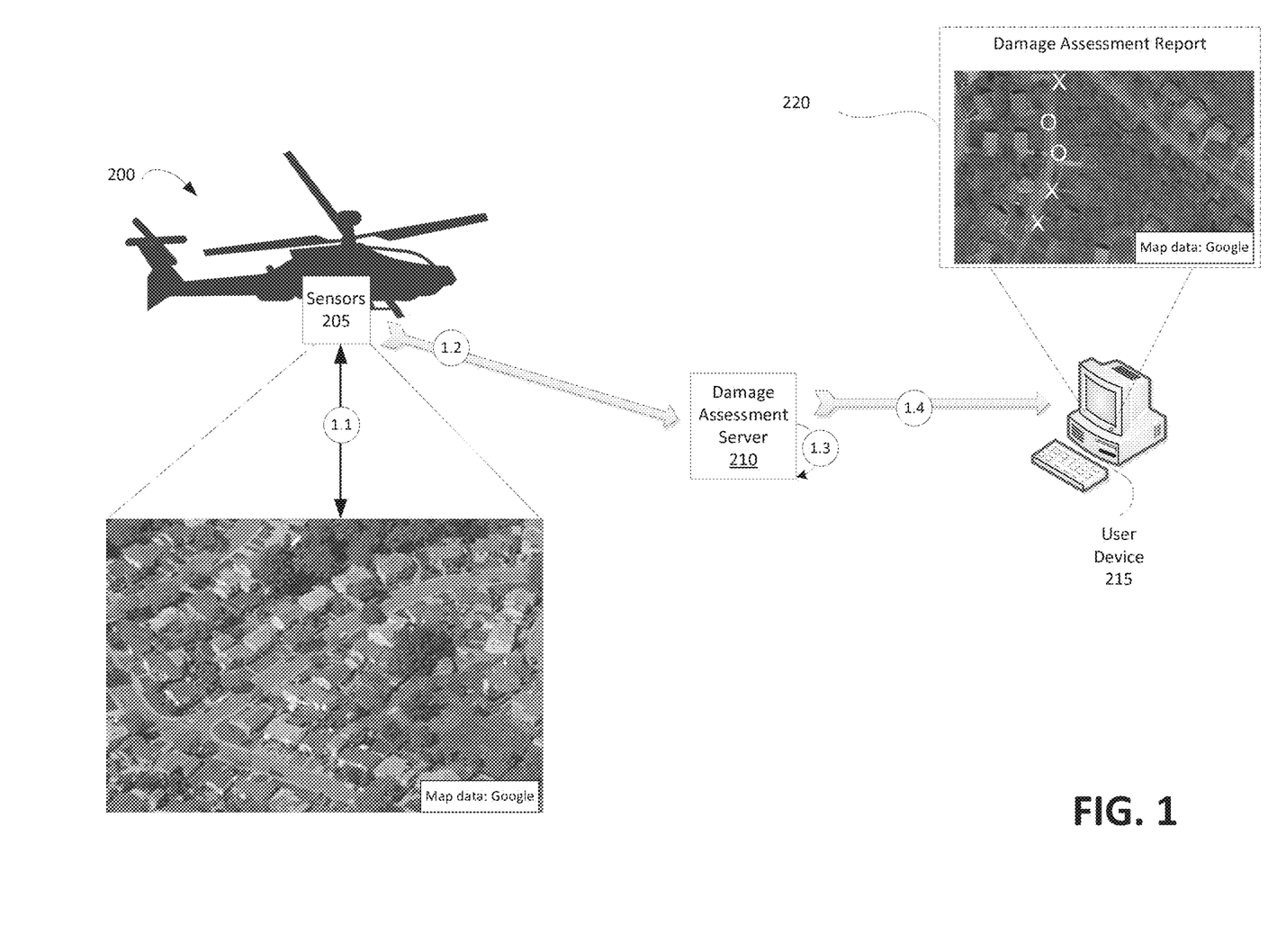
FIG. 1 shows an overview of an example implementation in accordance with aspects of the present invention.

FIG. 1 shows an overview of an example implementation in accordance with aspects of the present invention. As shown in FIG. 1, an aerial vehicle 200 may aerially survey a geographic area defined by a certain flight path. For example, the flight path may correspond to a geographic location affected by a natural disaster. During the flight of the aerial vehicle 200, sensors 205 on the aerial vehicle 200 gather raw data (at step 1.1). Each data point of the sensor data may include multiple attributes, such as location, color, etc. As described in greater detail herein, the raw data includes image-related data that is processed to determine the location of damaged assets and the extent of the damage.

In embodiments, a damage assessment server 210 receives the sensor data from the sensors 205 (at step 1.2). The damage assessment server 210 processes the sensor data (at step 1.3) to determine damaged assets, the location of damaged assets and the extent of the damage. For example, as described in greater detail herein, the damage assessment server 210 processes the sensor data by forming imagery from the sensor data and analyzing the sensor data by isolating features of interest to form 3D shapes.

In embodiments, the damage assessment server 210 may identify assets from the 3D shapes, perform a preliminary damage assessment of the assets, and perform a more detailed assessment (e.g., a "truth assessment") of certain assets in which the condition of the assets may be unknown or damaged as determined from the preliminary assessment. For example, a preliminary assessment may determine that an asset is intact when the asset is standing relatively upright (e.g., is positioned relatively perpendicularly (e.g., vertical) from the ground). The preliminary assessment may determine that the condition of the asset is unknown if the asset is not found from the sensor data (e.g., if the pole is obscured). In further embodiments, the preliminary assessment may determine that asset is damaged (e.g., if the asset is leaning greater than a threshold angle), or that there is a low confidence that the asset is intact (e.g., if the asset is leaning within minimum and maximum threshold angles).

In embodiments, a more detailed assessment may be performed when the determined condition of the asset (e.g., pole) is damaged, unknown, or of low confidence from the preliminary assessment. For example, a more detailed assessment may identify the condition of the asset's components (e.g., the pole, the power lines connected to the asset, a power line support of the asset, etc.). Further, the detailed assessment, also referred to herein as a "truth assessment" may be used to validate the results of the preliminary assessment.

Still referring to FIG. 1, the damage assessment server 210 outputs damage assessment information (step 1.4) based on processing of the sensor data. The damage assessment information may include results from the preliminary assessment and/or the truth assessment. A user device 215 receives the damage assessment information, and displays the damage assessment information as a visualization of assessed damage (e.g., as shown in interface 220). In embodiments, the visualization of assessed damage can identify the location of assets on a geographic map, the condition of the assets, (e.g., a level of severity of damage to the assets) and/or the type of damage. The visualization of assessed damage may be in various formats, as described in greater detail herein.

In the example shown in FIG. 1, the visualization of assessed damage includes a satellite view of a geographic area that was surveyed, and an indication regarding the condition of infrastructure assets. For example, undamaged assets are shown with a notation of "O" and damaged assets are shown with a notation of "X"; although other notations are also contemplated herein. The damage assessment information may be used by infrastructure maintenance personnel to dispatch repair personnel to the location in which damaged assets have been identified. Further, the best suited personnel and equipment may be dispatched based on the extent/severity of damage and/or the type of damage.

Since aerial vehicles could be used in conjunction with sensors, damage assessment is substantially faster in relation to when damage assessment is performed via using ground vehicles and in-person ground inspections. Advantageously, aspects of the present invention significantly reduce the time to assess infrastructure damage and thus reduce the amount of time to restore service. Further, aspects of the present invention provide a more thorough damage assessment than ground inspections, as aerial inspections can obtain imagery and sensor data in areas otherwise inaccessible by manual ground inspections. Further, safety hazards associated with ground inspections are avoided.

Figure 2:
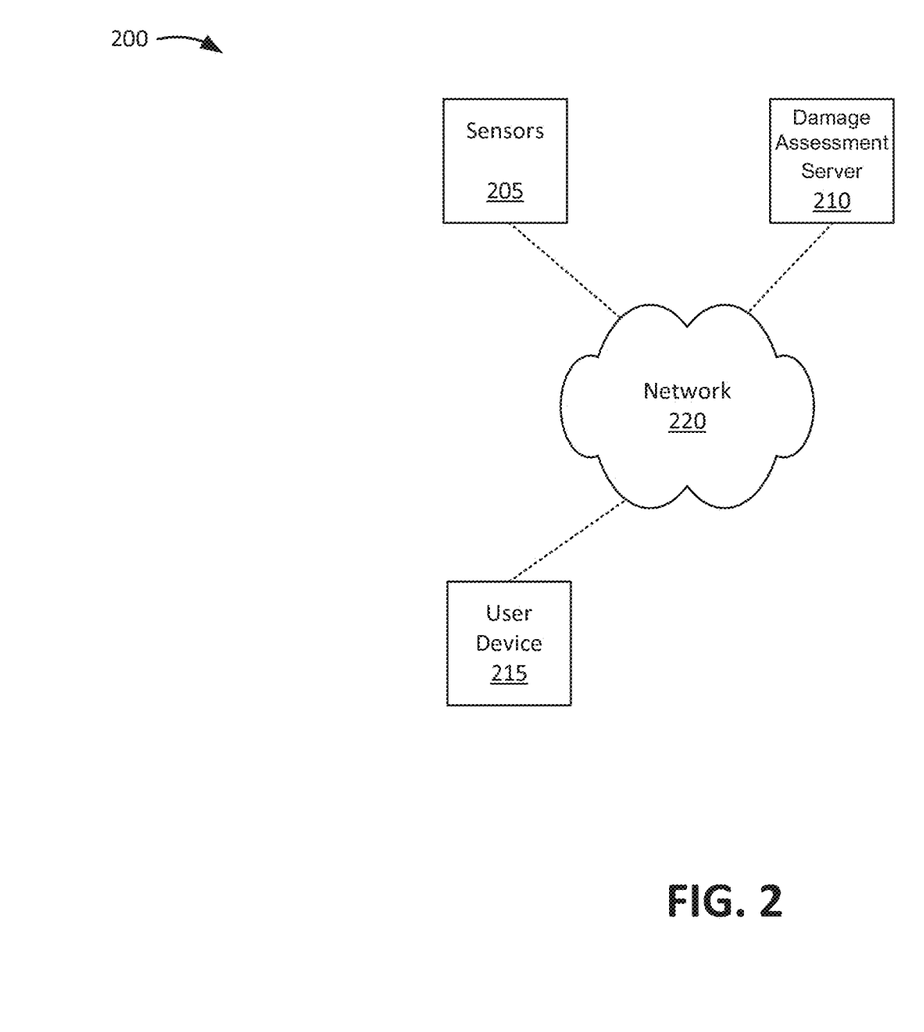
FIG. 2 shows an example implementation for defining a unit assessment area in accordance with aspects of the present invention.

FIG. 2 shows an example environment in accordance with aspects of the present invention. As shown in FIG. 2, environment 200 may include sensors 205, damage assessment server 210, user device 215, and/or a network 220. In embodiments, one or more components in environment 200 may correspond to one or more components in a cloud computing environment of FIG. 2.

Sensors 205 may include any number and combination of sensors that are designed and configured to capture image-related data. In embodiments the sensors 205 may include Electro-optical (EO) sensors (e.g., single and/or oblique/stereo), infrared imaging sensors, ultraviolet imaging sensor, Light Detection and Ranging (LiDAR) sensors, Synthetic Aperture Radar (SAR) sensors, cameras, radio frequency (RF) sensors, navigation data electromagnetic sensors; chemical gas sniffer sensors and/or other types of sensors. Each data point of the sensor data may include multiple attributes, such as location, color, etc. In embodiments, the sensors 205 may be implemented in aerial vehicles. In alternative embodiments, the sensors 205 may be implemented in ground and/or marine vehicles (e.g., manned or autonomous vehicles).

The damage assessment server 210 may include one or more server devices that receive sensor data from the sensors 205. As described herein, the damage assessment server 210 processes the sensor data by forming imagery from the sensor data and analyzing the sensor data by isolating features of interest to form 3D shapes. In embodiments, the damage assessment server 210 may identify assets from the 3D shapes, perform a preliminary assessment on the assets, and perform more detailed assessments on assets in which the condition is unknown or uncertain from the preliminary assessment.

The user device 215 may include one or more computing devices that receive information regarding damaged assets from the damage assessment server 210 (e.g., subsequent to the damage assessment server 210 processing the sensor data). The user device 215 may implement an application that displays the received information regarding damaged assets in a variety of different formats, as described in greater detail herein.

The network 220 may include one or more wired and/or wireless networks. For example, the network 220 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 220 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
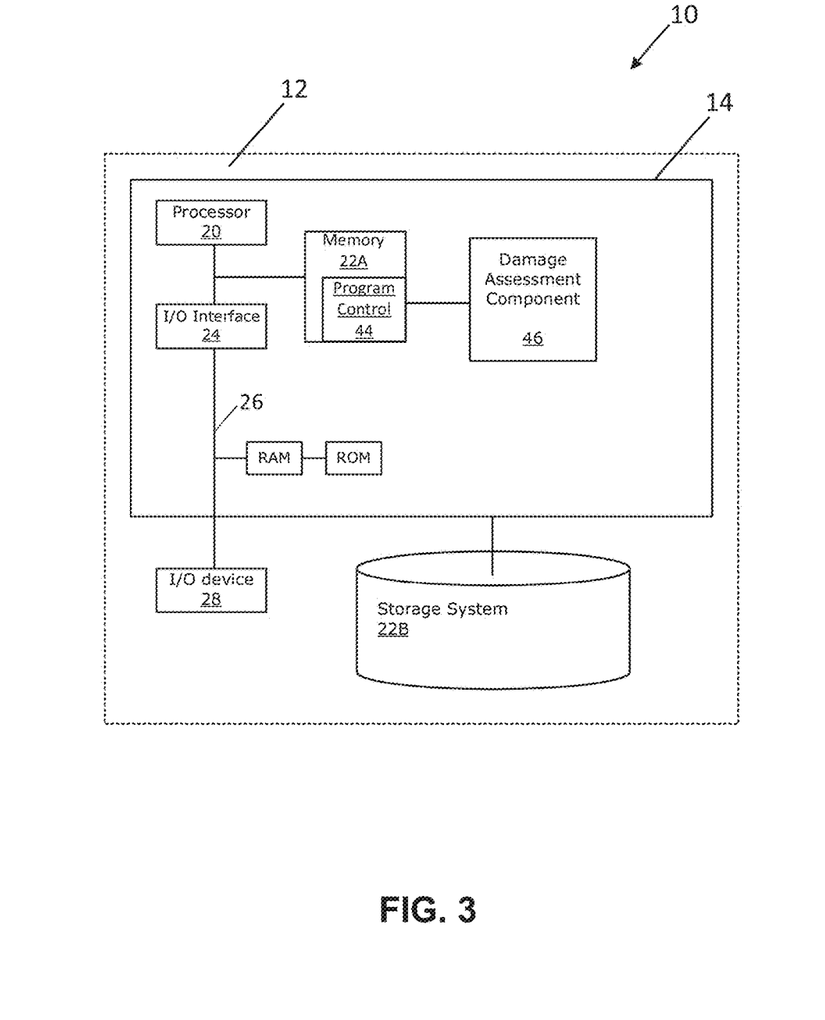
FIG. 3 shows an example environment in accordance with aspects of the present invention.

FIG. 3 shows an illustrative environment 10 for managing the processes in accordance with the invention. To this extent, environment 10 includes a server 12 or other computing system that can perform the processes described herein. In particular, server 12 can perform the processes of the damage assessment server 210 and/or other devices of FIG. 2. In embodiments, the server 12 includes a computing device 14. The computing device 14 can be resident on a network infrastructure or computing device of a third party service provider (any of which is generally represented in FIG. 3).

The computing device 14 includes a processor 20 e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (0/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be, for example, a handheld device, PDA, handset, keyboard etc.

In general, processor 20 executes computer program code e.g., program control 44), which can be stored in memory 22A and/or storage system 22B. The processor 20 may be used to execute a computer program product for automatically assessing and locating damage to infrastructure. The computer program product may include a computer readable storage medium having program instructions embodied therewith. The program instructions are executable to implement processes of the current invention, as described herein. Also, different types of computer readable storage media may be used, and the computer readable storage media is not a signal per se.

The computer readable storage medium is not a transitory signal per se, and is any tangible medium that can contain and store the program for use by or in connection with an instruction execution system, apparatus, or device. For example, the computer readable storage medium comprises, for example, such as electronic, magnetic, optical, electromagnetic, infrared, and/or semiconductor system. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

Moreover, in accordance with aspects of the invention, program control 44 controls a damage assessment component 46, e.g., the processes described herein. For example, damage assessment component 46 can implement the processes described in connection with the damage assessment server 210 as shown in FIG. 3 or other devices. The damage assessment component 46 can be implemented as one or more program code in program control 44 stored in memory 22A as separate or combined modules. Additionally, the damage assessment component 46 may be implemented as separate dedicated processors or a single or several processors to provide the function of these tools. The storage system 22B can store imagery data, location data, sensor data, and other information as described herein. In this way, for example, the sensor data can be obtained and stored in the storage system 22B for later access and analysis. For example, the sensor data can be accessed in order for assets to be identified, located, and assessed for damaged.

While executing the computer program code, the processor 20 can read and/or write data to/from memory 22A, storage system 22B, and/or I/O interface 24. Storage system 22B can include information associated with the cache, as described herein. The program code executes the processes of the invention, which can be provided as a computer program product stored on the computer readable storage medium. The bus 26 provides a communications link between each of the components in computing device 14.

The computing device 14 can comprise any general purpose computing article of manufacture capable of executing computer program code installed thereon e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks e.g., the Internet, a wide area network, a local area network, a virtual private network, etc.); and/or utilize any combination of transmission techniques and protocols.

Figure 4:
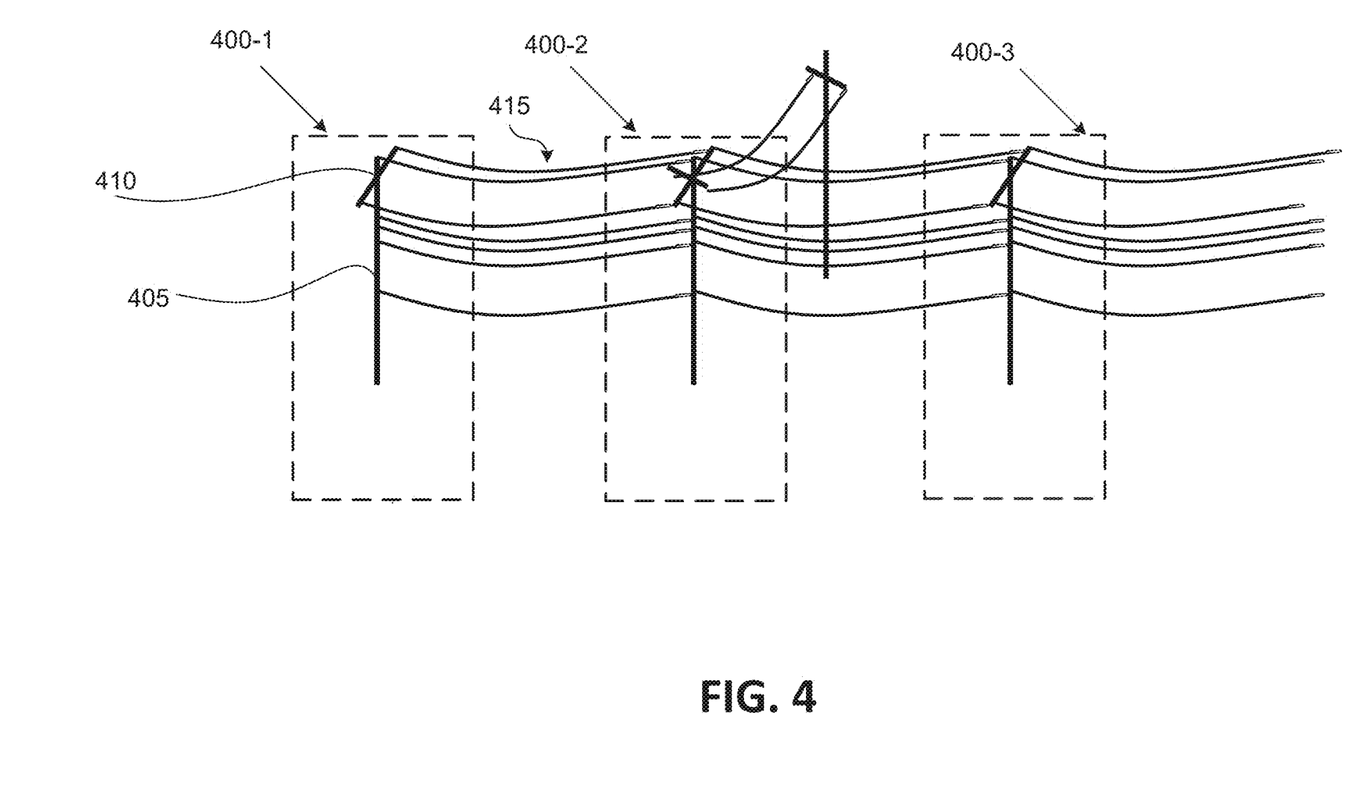
FIG. 4 shows an example for defining unit assessment areas in accordance with aspects of the present invention.

FIG. 4 shows an example for defining unit assessment areas in accordance with aspects of the present invention. In embodiments, unit assessment areas (UAAs) may be defined around an asset having a utility pole 405, a power line support 410, and wires 415 connected to and surrounding the utility pole 405. In the example of FIG. 4, three UAAs may be defined. For example, UAAs 400-1, 400-2, and 400-3 may be defined. In embodiments, the UAAs may be defined based on sensor data from which 3D objects are formed, and/or from a database that stores information regarding the location of such assets of the infrastructure. As described herein, if any one asset within a UAA is damaged, the entire UAA may be considered to be damaged. As described herein, each UAA may be assessed for damage based on the processes described herein.

Figure 5:
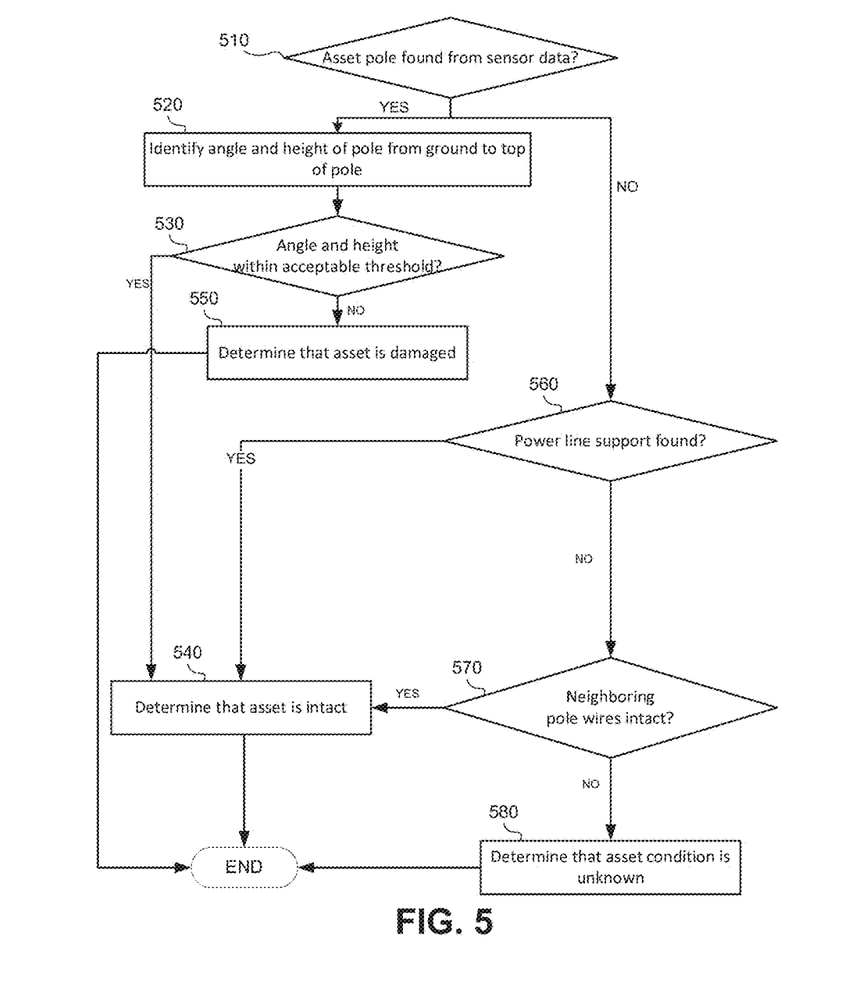
FIG. 5 shows an example flowchart for performing a preliminary assessment for an asset in which the asset condition is unknown in accordance with aspects of the present invention.

FIG. 5 shows an example flowchart for performing a preliminary assessment for an asset in which the asset condition is unknown in accordance with aspects of the present invention. The steps of FIG. 5 may be implemented in the environments of FIGS. 2-4, for example, and are described using reference numbers of elements depicted in FIGS. 2-4. As described herein, the flowchart illustrates the architecture, functionality, and operation of possible implementations of systems, methods, and computer program products according to various embodiments of the present invention.

As shown in FIG. 5, sensor data for a particular UAA is analyzed to determine whether an asset (e.g., hereinafter, in this example, referred to as an asset pole) is found within the sensor data (step 510). For example, as described herein, sensor data (e.g., gathered by sensors 205) is used to form 3D imagery of objects which are, in turn, classified and identified based on the features of the objects. An object may be determined to be an asset pole if the object exhibits known properties of an asset pole (e.g., is relatively long and slender, has the height and circumference of a known asset pole, etc.) If, for example, an asset pole is found from the sensor data of a particular UAA (step 510-YES), at step 520 an angle and height of the pole is determined from the ground to the top of the pole. For example, from the 3D imagery of the pole, endpoints of the pole may be overlaid at each end of the pole, and the angle and height of a line segment connecting the endpoints may be determined in order to identify the angle of the pole.

At step 530, a determination is made as to whether the angle and height are within acceptable thresholds. In embodiments, the acceptable threshold may be selected by an administrator based on a false-positive tolerance. For example, a relatively low angle or short height may reduce the chances that a damaged asset is not identified, whereas a relatively larger angle or tall height may reduce the chances of a false-positive. If the angle and/or height is within the acceptable threshold (step 530-YES), a determination is made that the asset is intact (step 540). If, on the other hand, the angle and/or height is not within the acceptable threshold (step 530-NO), a determination is made that the asset is damaged (step 550).

If, at step 510, an asset pole is not found from the sensor data, a determination is made as to whether a power line support is found (step 560). For example, the sensor data may be analyzed to determine whether any objects in the sensor data exhibit known properties of a power line support. If, for example, a power line support is found (560-YES), a determination is made that the asset is intact. If, on the other hand, a power line support is not found at step 560 (e.g., when the asset is obscured when the pole and its power line support are not found) a determination is made at step 570 as to whether neighboring pole wires are intact. For example, connectivity information may be used to identify neighboring assets (e.g., poles connected to the obscured asset). Sensor data localized to the locations of neighboring assets can be analyzed to determine the condition of the wires connected to the obscured asset.

In embodiments, the condition of wires may be determined by analyzing the height of the wires from the ground and the degree at which the wires are parallel to the ground, as examples. In embodiments, wires may normally sag between poles in which the amount of the sag may be a function of ambient temperature and current load in the wire. As a result, the wires may not be completely parallel to the terrain or ground. However, a wire may be determined to be intact when the height of the wires satisfies a particular threshold and when the wires are relatively parallel to the ground to a particular acceptable degree. In embodiments, the location of the asset may be inferred if the neighboring assets are not co-linear.

In embodiments, the condition of the wires may be indicative of the condition of the obscured asset. For example, if at step 570, a determination is made that the neighboring pole wires are intact, at step 540, a determination is made that the asset is intact. If, on the other hand, at step 570, a determination is made that the neighboring pole wires are not intact, at step 580, a determination is made that the asset condition is unknown. In embodiments, the condition of the asset or its components may be based on one or more other attributes of the asset (e.g., color, shady, density, temperature, material composition, etc.).

As described herein, confidence scores may be generated indicating the confidence of the preliminary assessment described with respect to FIG. 5. In embodiments, the confidence that the asset is intact, when the determination is made based on the condition of neighboring wires, may be relatively less than when the determination is made based on detecting the pole and identifying that the angle of the pole is within an acceptable threshold.

Figure 6:
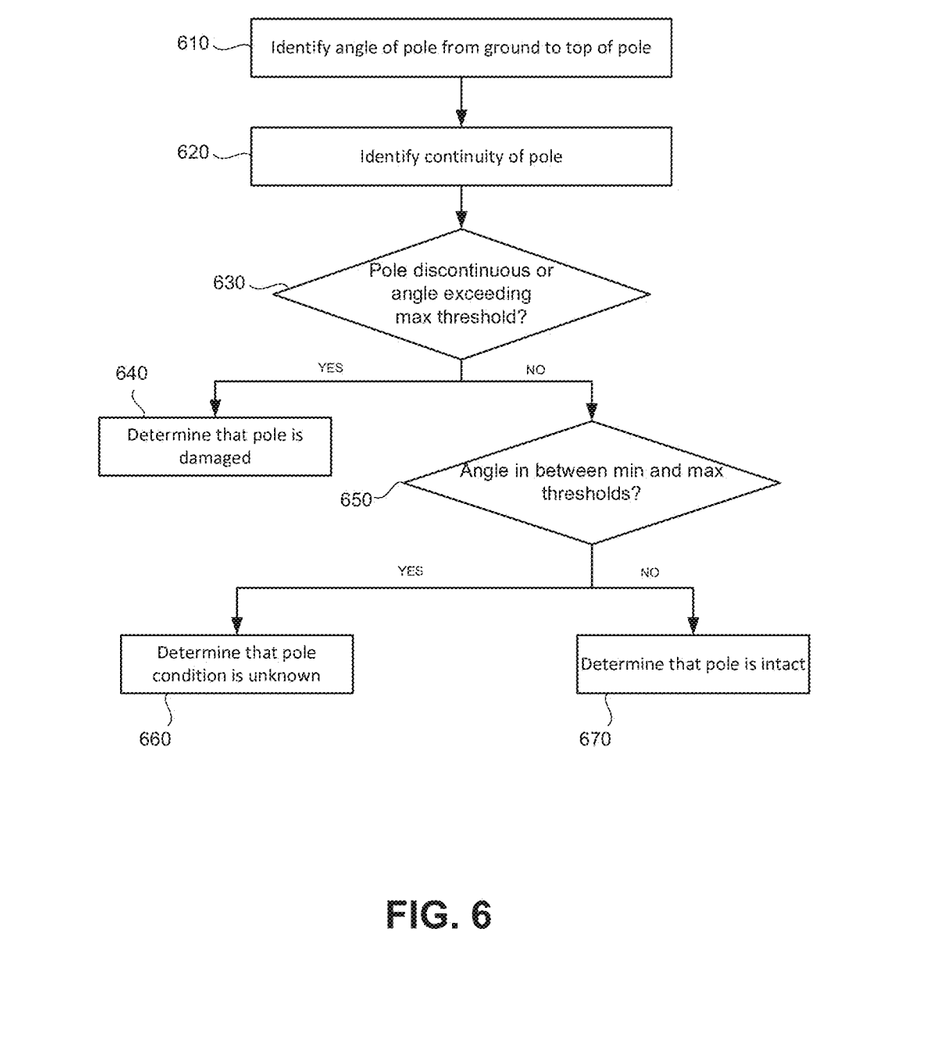
FIG. 6 shows an example flowchart for performing a truth assessment for a pole in accordance with aspects of the present invention.

FIG. 6 shows an example flowchart for performing a truth assessment for a pole in accordance with aspects of the present invention. The steps of FIG. 6 may be implemented in the environments of FIGS. 2-4, for example, and are described using reference numbers of elements depicted in FIGS. 2-4. As described herein, the flowchart illustrates the architecture, functionality, and operation of possible implementations of systems, methods, and computer program products according to various embodiments of the present invention.

In embodiments, the process of FIG. 6 may be performed to validate the preliminary assessment of an asset, as described in FIG. 5. Additionally, or alternatively, the process of FIG. 6 may be performed to perform a more detailed analysis of an asset based on the preliminary assessment of the asset, as described in FIG. 5. For example, if the preliminary assessment indicated that the condition of the asset was damaged, unknown, or had low confidence of being intact, FIG. 6 may be performed to further assess the damage of the asset's pole.

At step 610, an angle of the pole from the ground to the top of the pole is determined (e.g., in a similar manner as described above with respect to step 520). At step 620, the continuity of the pole is identified (e.g., from the sensor data). For example, a continuous pole is one that is intact for an entire length of the pole, whereas a discontinuous pole is in which a portion of the pole is missing along the entire length of the pole, indicating a broken pole. In embodiments, the pole continuity may be identified after inferring missing/obscured segments of the pole in which segments of the pole may be obscured (e.g., by vegetation or the like). In embodiments, the sensor data may be the original source for the data used to make the determination regarding the continuity of the pole. Additional processing may be completed prior to this determination to identify and isolate the relative data points from the sensor that are relative to the pole. This subset of data may also be used in determining the continuity of the pole.

At step 630, a determination is made as to whether the pole is discontinuous or if the angle exceeds a maximum threshold. If, at step 630, the pole is discontinuous or if the angle exceeds a maximum threshold (630-YES), a determination is made that the pole is damaged. If, at step 630, the pole is not discontinuous and the angle does not exceed the maximum threshold (630-NO), a determination is made as to whether the angle is between minimum and maximum thresholds, at step 650. In embodiments, the thresholds may be selected by an administrator based on a false-positive tolerance (e.g., a tolerance probability that an undamaged pole is incorrectly identified as a damaged pole). For example, relatively low thresholds may reduce the chances that a damaged asset is not identified, whereas relatively larger thresholds may reduce the chances of a false-positive. In embodiments, the thresholds may be based on business domain rules and/or best practices held in the industry.

If the angle is between the minimum and maximum thresholds (step 650-YES), at step 660, a determination is made that the condition of the pole is unknown. If, on the other hand, the angle is not between the minimum and maximum thresholds, e.g., if the pole is at or below the minimum threshold (step 650-NO), at step 670, a determination is made that the pole is intact. If the condition of the pole is unknown or damaged, the entire UAA associated with the pole may be considered to be damaged or identified for further manual and/or in-person investigation. In embodiments, information regarding the condition of the pole may be output to the user device 215 and/or stored by the damage assessment server 210.

Figure 7:
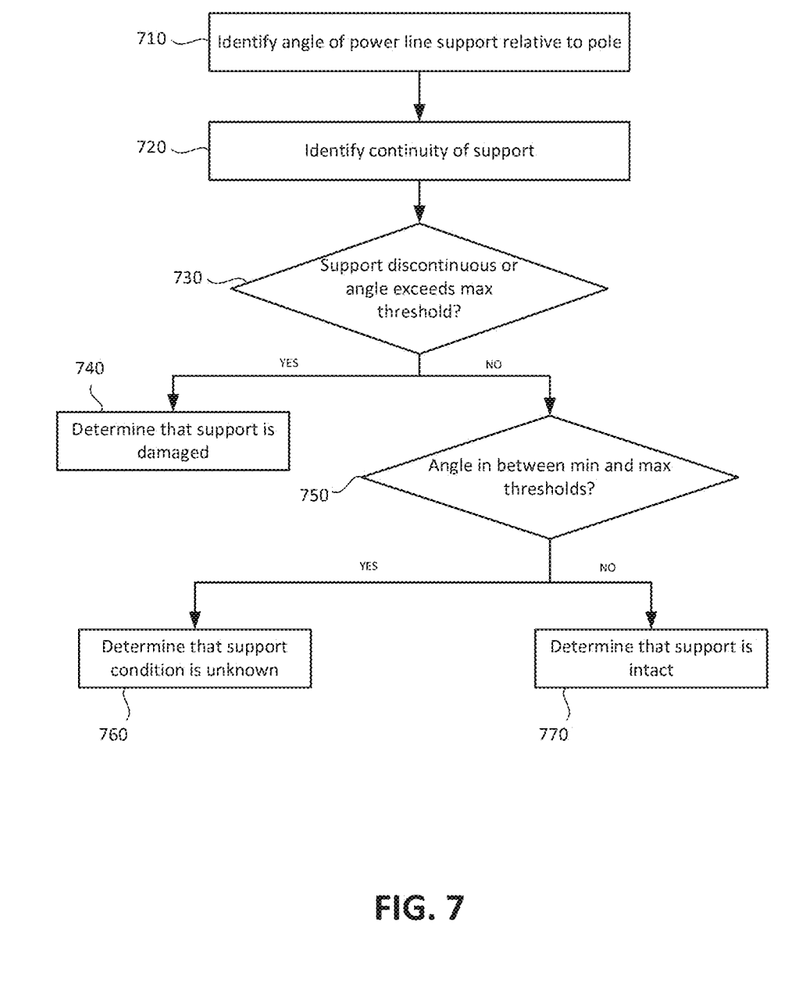
FIG. 7 shows an example flowchart for performing a truth assessment for a power line support of a pole in accordance with aspects of the present invention.

FIG. 7 shows an example flowchart for performing a truth assessment for a power line support of a pole in accordance with aspects of the present invention. The steps of FIG. 7 may be implemented in the environments of FIGS. 2-4, for example, and are described using reference numbers of elements depicted in FIGS. 2-4. As described herein, the flowchart illustrates the architecture, functionality, and operation of possible implementations of systems, methods, and computer program products according to various embodiments of the present invention.

In embodiments, the process of FIG. 7 may be performed to validate the preliminary assessment of an asset, as described in FIG. 5. Additionally, or alternatively, the process of FIG. 7 may be performed to perform a more detailed analysis of an asset based on the preliminary assessment of the asset, as described in FIG. 5. For example, if the preliminary assessment indicated that the condition of the asset was damaged, unknown, or had low confidence of being intact, FIG. 7 may be performed to further assess the damage of the asset's power line support.

At step 710, an angle of a support of the power line support relative to the pole is determined. For example, the support may be detected from sensor data based on objects deciphered from the sensor data that match the characteristics of the support. Further, the power line support and pole deciphered from sensor data may be analyzed to determine the support of the power line support relative to the pole. At step 720, the continuity of the support is identified (e.g., from the sensor data). For example, a continuous support is one that is intact for an entire length of the support, whereas a discontinuous support is one in which a portion of the support is missing along the entire length of the support, indicating a broken support.

At step 730, a determination is made as to whether the support is discontinuous or if the angle exceeds a maximum threshold. If, at step 730, the support is discontinuous or if the angle exceeds a maximum threshold (730-YES), a determination is made that the pole is damaged. If, at step 730, the support is not discontinuous and the angle does not exceed the maximum threshold (730-NO), a determination is made as to whether the angle is in between minimum and maximum thresholds at step 750. In embodiments, the thresholds may be selected by an administrator based on a false-positive tolerance. For example, relatively low thresholds may reduce the chances that a damaged support is not identified, whereas relatively larger thresholds may reduce the chances of a false-positive.

If the angle is between the minimum and maximum thresholds (step 750-YES), at step 760, determination is made that the condition of the support is unknown. If, on the other hand, the angle is not between the minimum and maximum thresholds, e.g., if the support is at or below the minimum threshold (step 750-NO), at step 770, a determination is made that the support is intact. If the condition of the support is unknown or damaged, the entire UAA associated with the support may be considered to be damaged or identified for further manual and/or in-person investigation. In embodiments, information regarding the condition of the support may be output to the user device 215 and/or stored by the damage assessment server 210.

Figure 8:
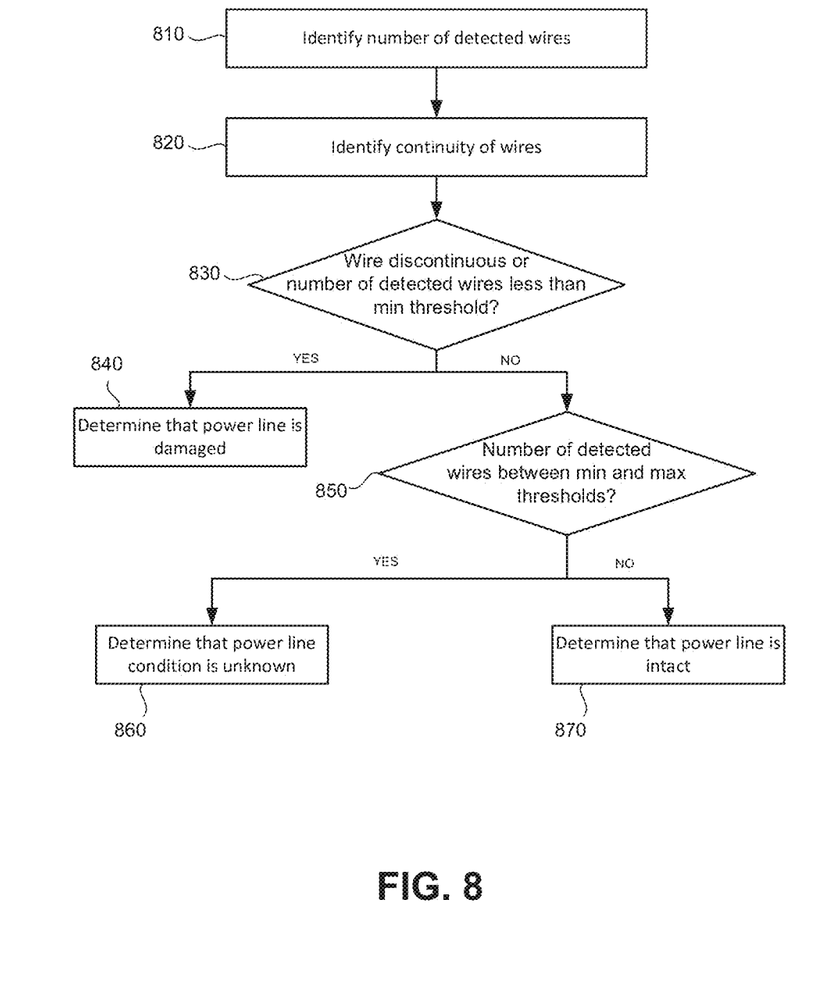
FIG. 8 shows an example flowchart for performing a truth assessment for a power line of a pole in accordance with aspects of the present invention.

FIG. 8 shows an example flowchart for performing a truth assessment for a power line of a pole in accordance with aspects of the present invention in accordance with aspects of the present invention. The steps of FIG. 8 may be implemented in the environments of FIGS. 2-4, for example, and are described using reference numbers of elements depicted in FIGS. 2-4. As described herein, the flowchart illustrates the architecture, functionality, and operation of possible implementations of systems, methods, and computer program products according to various embodiments of the present invention.

In embodiments, the process of FIG. 8 may be performed to validate the preliminary assessment of an asset, as described in FIG. 5. Additionally, or alternatively, the process of FIG. 6 may be performed to perform a more detailed analysis of an asset based on the preliminary assessment of the asset, as described in FIG. 5. For example, if the preliminary assessment indicated that the condition of the asset was damaged, unknown, or had low confidence of being intact, FIG. 6 may be performed to further assess the damage of the asset's power line.

At step 810, the number of wires connected to the pole is detected. For example, the wires may be detected from sensor data based on objects deciphered from the sensor data that match the characteristics of wires. At step 820 the continuity of the wires is determined (e.g., from the sensor data). For example, a continuous wire is one that is intact for an entire length of the wire, whereas a discontinuous wire is one in which a portion of the wire is missing along the entire length of the wire, indicating a broken wire.

At step 830, a determination is made as to whether a wire is discontinuous or if the number of detected wires is less than a minimum threshold. If, at step 830, the support is discontinuous or if the number of detected wires is less than the minimum threshold (830-YES), a determination is made that the power line of the pole is damaged. If, at step 830, the support is not discontinuous and the number of detected wires is above the minimum threshold (830-NO), a determination is made as to whether the number of detected wires is between minimum and maximum thresholds, at step 850. In embodiments, the thresholds may be selected by an administrator based on a false-positive tolerance and/or the type of pole and power line. For example, relatively low thresholds may reduce the chances that a damaged support is not identified, whereas relatively larger thresholds may reduce the chances of a false-positive. Also, certain pole types may have a different number of wires based on their function, and the thresholds may be based on the pole type (e.g., 1, 2, 3-phase configurations, etc.). Further, an asset information database may include information defining the number of wires connected to the pole, which, in turn, could be used to fine tune the minimum and maximum thresholds for a pole.

If the number of detected wires is between the minimum and maximum thresholds (step 850-YES), at step 860, a determination is made that the condition of the power line is unknown. If, on the other hand, the number of detected wires is not in between the minimum and maximum thresholds, e.g., if the number of detected wires is at or above the minimum threshold (step 850-NO), at step 870, a determination is made that the power line is intact. If the condition of the power line is unknown or damaged, the entire UAA associated with the support may be considered to be damaged or identified for further manual and/or in-person investigation. In embodiments, information regarding the condition of the power line may be output to the user device 215 and/or stored by the damage assessment server 210.

Figure 9:
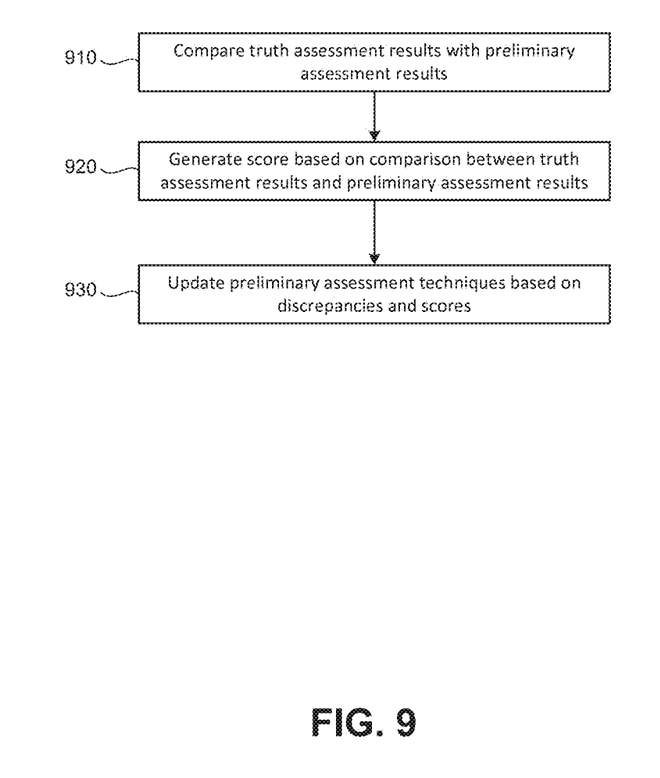
FIG. 9 shows an example flowchart for updating an automated assessment process based on comparing preliminary assessment results with truth assessment results in accordance with aspects of the present invention.

FIG. 9 shows an example flowchart for updating an automated assessment process based on comparing preliminary assessment results with truth assessment results in accordance with aspects of the present invention. The steps of FIG. 9 may be implemented in the environments of FIGS. 2-4, for example, and are described using reference numbers of elements depicted in FIGS. 2-4. As described herein, the flowchart illustrates the architecture, functionality, and operation of possible implementations of systems, methods, and computer program products according to various embodiments of the present invention. In embodiments, the process of FIG. 9 may be used during software development and/or updating.

At step 910, truth assessment results are compared with preliminary assessment results for a group of assets. For example, the preliminary assessment results for a group of assets, as obtained via the process of FIG. 5, is compared to the truth assessment results for a group of assets, as obtained via the processes of FIGS. 6-8. In embodiments, the results are compared to determine if the preliminary assessment results matched the truth assessment results (e.g., to determine a level of accuracy of the preliminary assessment results).

At step 920, scores are generated based on the comparison between the truth assessment and the preliminary assessment results. In embodiments, the scores may indicate the degree of accuracy of the preliminary assessment results. In embodiments, the score may have a range such as a range between 0%-100%, or a different range. In embodiments, the score is positively affected when a preliminary assessment of an asset matches detailed assessments of the same asset. The score is adversely affected if a preliminary assessment indicated that an asset is intact, and a detailed assessment of the pole determined that the asset was damaged.

In embodiments, the scores may be weighted. For example, the condition of a pole, as determined by a detailed assessment of the pole as described in FIG. 6, may be weighted higher than the condition of a cross-arm, as determined by a detailed assessment of the power line support as described in FIG. 7. As an example, the score may be relatively more adversely affected if a detailed assessment of the pole indicates damage versus the detailed assessment of the power line support indicating damage.

At step 930, preliminary assessment techniques may be updated or refined based on discrepancies and scores. For example, discrepancies may be identified between truth assessments and preliminary assessments. In the event of a discrepancy, an analysis may be performed to identify image features that should be considered more thoroughly when performing the preliminary assessment. As an example, if a preliminary assessment indicated that an asset was intact, but a truth assessment indicated that the power line support of the asset was damaged, image features corresponding to the damaged power line support may be considered and incorporated into the preliminary assessment techniques for future preliminary assessments. For example, weightings may be adjusted in the preliminary assessment to more heavily weigh image features corresponding to the damaged power line support (or other damaged component of the asset). In this way, greater consideration is given to image features that correspond to a damaged asset component when performing future preliminary assessments. Accordingly, future preliminary assessments may be more accurate than prior preliminary assessments.

In embodiments, the score may be stored for different versions of the preliminary assessment techniques. In this way, the performance of different versions of the preliminary assessment techniques can be tracked. As an example, if an updated version of the preliminary assessment techniques adversely affected the score, a previous version can be restored. In embodiments, partial and interim assessment results, with associated confidence levels, may be obtained from the process of FIG. 9. Arbitration techniques may be used to develop an overall assessment and confidence level. In embodiments, the process of FIG. 9 may be used during software development and/or updating, but not necessarily during the damage assessment process.

Aspects of the present invention may assist a variety of service providers to expedite the assessment of infrastructure damage, which in turn, expedites the restoration of service. Potential benefiting parties may include utility providers (e.g., electric, gas, water, telephone, cable), energy distribution companies (e.g., pipelines, transmission lines), disaster response agencies (Federal Emergency Management Agency (FEMA), etc.), government agencies, and/or private organizations responsible for safety inspections in public facilities (e.g., roads, bridges, tunnels, roofs, parking garages). Aspects of the present invention may also support other domains in which a set of rules are established to define the condition of an asset.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Images and related data of aerial photographs and maps shown in one or more of the FIGS. are provided by Google.

What is claimed is:

1. A computer-implemented method comprising:
receiving, by a computing device, a single set of sensor data associated with a geographic location;
forming, by the computing device, imagery data including a three-dimensional (3D) image of an object from the single set of sensor data;
processing, by the computing device, the single set of sensor data to identify an infrastructure asset within the geographic location using the imagery data including the three-dimensional (3D) image of the object;
performing, by the computing device, a damage assessment of the infrastructure asset based on analyzing the imagery data including the three-dimensional (3D) image formed from the single set of sensor data;
storing or outputting, by the computing device, information regarding the damage assessment; and
displaying as a visualization, on a display of the computing device, the damage assessment of the infrastructure asset, the visualization including identifying a location of the infrastructure asset on a geographic map, a condition of the infrastructure asset, and/or a type of damage, which is overlaid onto a view of the geographic location that was surveyed obtained by an aerial vehicle, by the computing device,
wherein the performing the damage assessment further comprises:

in response to determining that an angle between the infrastructure asset and ground is greater than a first threshold angle, determining that the condition of the infrastructure asset is intact;

in response to determining that the angle is between the first threshold angle and a second threshold angle smaller than the first threshold angle, determining that the condition of the infrastructure asset is unknown; and in response to determining that the angle is less than the second threshold angle, determining that the condition of the infrastructure asset is damaged.

2. The method of claim 1, wherein performing the damage assessment further comprises:

identifying a physical feature of the infrastructure asset; and determining the condition of the infrastructure asset based on identifying the physical feature.

3. The method of claim 2, wherein performing the damage assessment comprises: identifying a height of the infrastructure asset; and determining the condition of the infrastructure asset based on the angle or the height of the infrastructure asset.

4. The method of claim 2, wherein performing the damage assessment further comprises:

identifying a condition of another physical feature that neighbors the infrastructure asset; and determining the condition of the infrastructure asset based on the condition of the other physical feature that neighbors the infrastructure asset.

5. The method of claim 2, further comprising:

performing a detailed analysis on a component of the infrastructure asset when the damage assessment produces an inconclusive result or a result less than a threshold confidence.

6. The method of claim 5, wherein performing the detailed analysis on the component of the infrastructure asset includes:

identifying a continuity of the infrastructure asset; and determining the condition of the infrastructure asset based on the continuity of the infrastructure asset.

7. The method of claim 5, wherein performing the detailed analysis on the component of the infrastructure asset includes:

identifying an angle of a power line support relative to a pole asset;

identifying a continuity of the power line support; and determining a condition of the power line support based on the continuity of the power line support and the angle of the power line support relative to the pole asset.

8. The method of claim 5, wherein performing the detailed analysis on the component of the infrastructure asset includes:

identifying a number of wires connected to a pole;

identifying a continuity of wires associated with the pole; and determining a condition of the wires based on the continuity of the wires and the number of wires connected to the pole.

9. The method of claim 5, wherein performing the damage assessment is further based on at least one of:

color;
shadow;
density;
temperature; and
material composition.

10. The method of claim 1, wherein processing the single set of sensor data comprises:

determining that the object represents the infrastructure asset based on comparing predefined attributes of the infrastructure asset with attributes of the object.

11. The method of claim 1, wherein the single set of sensor data includes at least one of:

Light Detection and Ranging (LiDAR) data;
Synthetic Aperture Radar (SAR) data;
Electro-optical (EO) data;
infrared imaging data;
ultraviolet imaging data;
radio frequency (RF) data;
navigation data;
electromagnetic data;
chemical gas sniffer data; and
camera data.

12. The method of claim 1, wherein the analyzing the imagery data formed from the single set of sensor data in the performing the damage assessment comprises using location information of the infrastructure asset obtained from a database.

13. The method of claim 1, further comprising:

in response to determining that the condition of the infrastructure asset is unknown or damaged, performing a detailed analysis on each of a plurality of components of the infrastructure asset.

14. A computer program product for automatically assessing damage to infrastructure, the computer program product comprising a computer readable storage medium having program instructions embodied therewith, the program instructions executable by a computing device to cause the computing device to:

obtain a single set of sensor data;

form imagery data including a three-dimensional (3D) image of an object from the single set of sensor data;

identify an infrastructure asset within a geographic location using the imagery data including the three-dimensional (3D) image formed from the single set of sensor data and location information of the infrastructure asset obtained from a database;

perform a preliminary damage assessment of the infrastructure asset based on analyzing the imagery data including the three-dimensional (3D) image formed from the single set of sensor data to determine a relative positioning of the infrastructure asset;

perform a detailed damage assessment on each of a plurality of components of the infrastructure asset when the preliminary damage assessment produces an inconclusive result or a result less than a threshold confidence; and display as a visualization, the preliminary damage assessment of the infrastructure asset, the visualization including identifying a location of the infrastructure asset on a geographic map, a condition of the infrastructure asset, and/or a type of damage, which is overlaid onto a view of the geographic location that was surveyed obtained by an aerial vehicle, wherein the performing the preliminary damage assessment further comprises:

in response to determining that an angle between the infrastructure asset and ground is greater than a first threshold angle, determining that the condition of the infrastructure asset is intact;

in response to determining that the angle is between the first threshold angle and a second threshold angle smaller than the first threshold angle, determining that the condition of the infrastructure asset is unknown; and in response to determining that the angle is less than the second threshold angle, determining that the condition of the infrastructure asset is damaged.

15. The computer program product of claim 14, wherein performing the preliminary damage assessment comprises: identifying a type of infrastructure associated with the infrastructure asset; identifying a height of the type of infrastructure asset; and determining the condition of the infrastructure asset based on the angle or the height of the type of infrastructure.

16. The computer program product of claim 15, wherein performing the preliminary damage assessment further comprises:

identifying a feature of the type of infrastructure; and
determining the condition of the infrastructure asset based on identifying the feature.

17. The computer program product of claim 15, wherein performing the preliminary damage assessment further comprises:

identifying a condition of a wire that neighbors the type of infrastructure; and
determining the condition of the infrastructure asset based on the condition of the wire that neighbor the type of infrastructure.

18. The computer program product of claim 15, wherein performing the detailed analysis on each of the plurality of components of the infrastructure asset includes:

identifying a continuity of the type of infrastructure; and
determining the condition of the infrastructure asset based on the continuity of the type of infrastructure.

19. The computer program product of claim 15, wherein performing the detailed analysis on each of the plurality of components of the infrastructure asset includes:

identifying an angle of a power line support relative to the type of infrastructure;
identifying a continuity of the power line support; and
determining a condition of the power line support based on the continuity of the power line support and the angle of the power line support relative to the type of infrastructure.

20. The computer program product of claim 15, wherein performing the detailed analysis on each of the plurality of components of the infrastructure asset includes:

identifying a number of wires connected to the type of infrastructure;
identifying a continuity of the wires; and
determining a condition of the wires based on the continuity of the wires and the number of wires connected to the type of infrastructure.

21. A system comprising:

a CPU, a computer readable memory and a computer readable storage medium associated with a computing device;

program instructions to receive and process a single set of sensor data to identify an infrastructure asset within a geographic location;

program instructions to form 3D shapes of an object from the single set of sensor data;

program instructions to perform a preliminary damage assessment of the infrastructure asset based on processing the single set of sensor data by isolating features of interest from the 3D shapes;

program instructions to perform a detailed damage assessment on a component of the infrastructure asset by analyzing the 3D shapes to determine that the 3D shapes are within certain predefined limits;

program instructions to compare results of the preliminary damage assessment with results of the detailed damage assessment;

program instructions to refine a process used to perform the detailed damage assessment based on comparing the results of the preliminary damage assessment with the results of the detailed damage assessment; and program instructions to display as a visualization, the detailed damage assessment of the infrastructure asset, which includes identifying a location of the infrastructure asset on a geographic map, a condition of the infrastructure asset, and a type of damage overlaid onto a view obtained by an aerial vehicle, wherein the program instructions are stored on the computer readable storage medium for execution by the CPU via the computer readable memory, and wherein the performing the preliminary damage assessment further comprises:

in response to determining that an angle between the infrastructure asset and ground is greater than a first threshold angle, determining that the condition of the infrastructure asset is intact;

in response to determining that the angle is between the first threshold angle and a second threshold angle smaller than the first threshold angle, determining that the condition of the infrastructure asset is unknown; and in response to determining that the angle is less than the second threshold angle, determining that the condition of the infrastructure asset is damaged.

22. The system of claim 21, wherein refining the process includes modifying a weighting of image features when performing the preliminary assessment.

* * * * *